(12) United States Patent
Terakado et al.

(10) Patent No.: US 6,308,180 B1
(45) Date of Patent: Oct. 23, 2001

(54) COMPUTER PROCESS DATA TRANSFERRING WITH AUTOMATIC CLIPPING OF PICTURES

(75) Inventors: Kenji Terakado, Hitachi; Kiyoshi Masuda, Hitachinaka, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/158,142

(22) Filed: Sep. 22, 1998

(30) Foreign Application Priority Data

Sep. 22, 1997 (JP) .................................................. 9-256814

(51) Int. Cl.[7] .................................................. G06F 17/00
(52) U.S. Cl. .................................................. 707/102; 707/104
(58) Field of Search .................................................. 707/512, 103, 707/102, 104, 10; 709/223

(56) References Cited

U.S. PATENT DOCUMENTS

| | | | |
|---|---|---|---|
| 4,839,699 | * | 6/1989 | Hosaka et al. ........................ 355/55 |
| 5,809,318 | * | 9/1998 | Rivette et al. ........................ 707/512 |
| 5,813,009 | * | 9/1998 | Johnson et al. ........................ 707/100 |
| 5,905,866 | * | 5/1999 | Nakabayashi et al. ............... 709/223 |
| 5,959,670 | * | 9/1999 | Tamura et al. ........................ 348/364 |
| 5,959,867 | * | 9/1999 | Speciner et al. ...................... 707/103 |
| 5,987,464 | * | 11/1999 | Schneider ................................ 707/10 |
| 6,032,156 | * | 2/2000 | Marcus ................................ 707/104 |

* cited by examiner

Primary Examiner—Thomas Black
Assistant Examiner—Charles L. Rones
(74) Attorney, Agent, or Firm—Antonelli, Terry, Stout & Kraus, LLP

(57) ABSTRACT

An information processing apparatus includes a display unit for displaying characters and figures, an auxiliary memory unit for storing picture data, a transmission unit for transmitting data with to other information processing apparatuses, and a transmission control unit for controlling data transmission between information processing apparatuses; wherein designated picture data is automatically clipped, and the information processing apparatus further includes a control unit for automatically controlling transfer of a file including the clipped picture data to a designated one of the other information processing apparatuses via the transmission unit, whereby it becomes easy to transfer the file to other information processing apparatuses connected via a transmission unit, thereby the operating efficiency of the information processing apparatus.

10 Claims, 6 Drawing Sheets

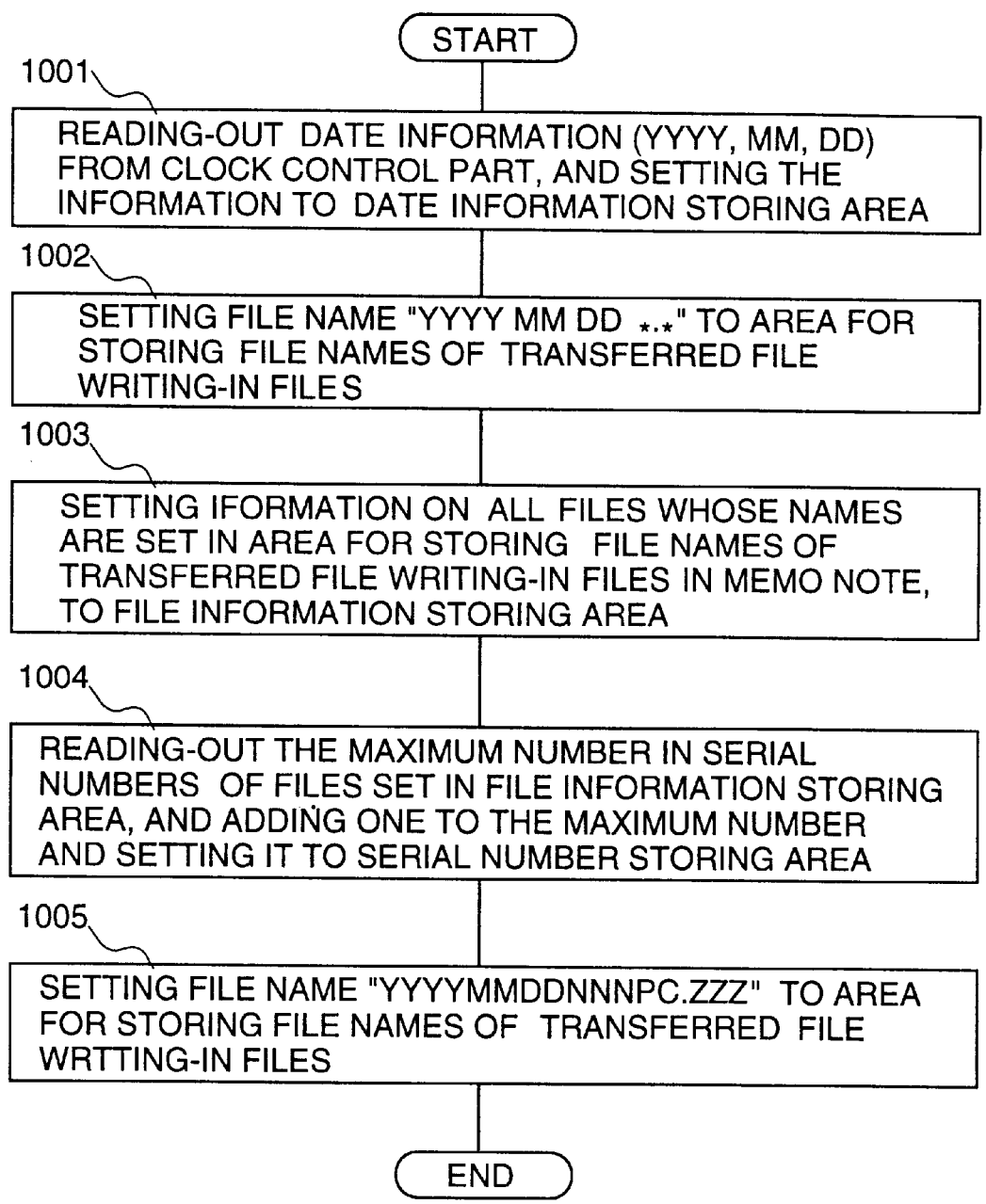

COMPUTER PROCESS DATA TRANSFERRING WITH AUTOMATIC CLIPPING OF PICTURES

BACKGROUND OF THE INVENTION

The present invention relates to an information processing apparatus, and to a technique for clipping picture data and transferring a file of the clipped picture data to other information processing apparatuses connected to this information processing apparatus via a transmission system.

When picture data is transferred to another information processing apparatus via a transmission system from an information processing apparatus where the data is being displayed, at first, the picture data displayed on a screen in the information processing apparatus which is to transfer the picture data is clipped, and the clipped picture data is then given a file name and is stored as a file in an auxiliary memory, for example, in a fixed head disk drive. Next, by designating the file stored in the auxiliary memory, the designated file is transferred to another information processing apparatus, to which the file is to be transferred, via the transmission system, and is stored in memory therein. Then, in the information processing apparatus which has received and stored the transferred file, a memory area to which the file has been transferred is searched, and by designating the searched file, the transferred picture data clipped at the information processing apparatus which sent the file are displayed.

Because clipping the picture data and transferring the file can not be executed in one operational process in the above-described conventional information processing apparatus for transferring a file of clipped picture data, the operating efficiency of the apparatus for transferring picture data is poor.

Furthermore, in the information processing apparatus which has received the transferred file, because it is necessary to search the memory area to which the clipped picture data has been transferred before the picture data can be displayed, the operating efficiency of the apparatus for receiving the picture data is also poor.

SUMMARY OF THE INVENTION

An object of the present invention is to provide an information processing apparatus having a high operating efficiency, in which the clipping of picture data and the transferring of a file including the clipped picture data are executed in one operational process, and in which the picture data transferred to another information processing apparatus is easily displayed without searching the memory area to which the picture data was transferred.

The first feature of the present invention, which is designed to attain the above object, resides in the provision of an information processing apparatus including a display unit for displaying characters and figures, an auxiliary memory unit for storing picture data and the like, a transmission unit for transmitting data between information processing apparatuses, and a control unit for controlling data transmission between the information processing apparatuses; wherein designated picture data is automatically clipped, and the information processing apparatus further includes means for automatically controlling the transfer of a file including the clipped picture data to a designated one of the other information processing apparatuses via the transmission unit.

In accordance with the first feature, because the clipping of designated picture data and the transferring of a file including the clipped picture data can be automatically executed, it becomes simple to transfer the file to other information processing apparatuses via the transmission unit, which improves the operating efficiency of the information processing apparatus.

The second feature of the present invention resides in the fact that, in the above information processing apparatus, an area to which the file is transferred is a data area of a memo note having a function of managing files of memo data with date information and listing-up the files of the memo data in the order of the date, and date information at indicating time when the file is transferred is added to the name of the file to be transferred.

In accordance with the second feature, because a file is transferred to a data area of a memo note having a function of managing files of memo data with date information, by listing-up the files of memo data in the order of their date and adding date information, indicating the time when the file is transferred, to a name of the file being transferred, managing of file transfer becomes easy.

The third feature of the present invention resides in the fact that the above information processing apparatus further includes means for designating a name of the file and an area to which the file is to tee transferred in the designated one of the other information processing apparatuses via the transmission unit by using an environment setting dialog box.

In accordance with the third feature, because it is possible to designate a name of the file and an area to which the file is to be transferred in the designated one of the other information processing apparatuses via the transmission unit using an environment setting dialog box, managing the file transfer becomes easy. However, if an area to which the file is to be transferred is not designated in the environment setting dialog box, it is not necessary to designate an area to which the file is to be transferred in a portable terminal apparatus (another information processing apparatus), because, in this case, the file is automatically transferred to an area managed by the system, which improves the operating efficiency. On the other hand, if an area to which a file is to be transferred (referred to as a file transfer area) is designated in the environment setting dialog box, a user can change the file transfer area freely. Thus, the file transfer area can be selected according to the plan of the user.

The fourth feature of the present invention resides in the fact that the above information processing apparatus further includes means for inputting a file transfer area to which the clipped picture data is to be transferred and a file name, when the picture data is clipped, if it is designated in the environment setting dialog box in advance to set a file transfer area and a name of a file.

In accordance with the fourth feature, because a file transfer area to which the picture data is to be transferred and the file name are inputted when the picture data is clipped, if it is designated in the environment setting dialog box in advance to set a file transfer area and a file name, the correspondence between the clipped picture data and the file transfer area and its name, to which the picture data is to be transferred, becomes clear, which also improves the operating efficiency.

The fifth feature of the present invention resides in the fact that the above information processing apparatus further includes means for displaying a file transfer area, to which the file of the picture data was transferred, and a file name in the designated one of the other information processing apparatuses via the transmission unit after the transferring of the picture data has been finished.

In accordance with the fifth feature, because the file transfer area, to which the file of the picture data was transferred, and the file name are displayed in the designated one of the other information processing apparatuses connected via the transmission unit after the transferring of the picture data has been finished, it becomes easy to recognize the correspondence between the clipped picture data and the file transfer area and its name. Thus, the operating efficiency is further improved.

The sixth feature of the present invention resides in the fact that the above information processing apparatus further includes means for selecting the size of a picture displayed on a screen of the designated one of the other information processing apparatuses connected via the transmission unit when the picture data is clipped and the file of the picture data is transferred.

In accordance with the sixth feature, because the size of a picture displayed on a screen of another information processing apparatus connected via the transmission unit is selected in the control of clipping the picture data and transferring the file of the picture data, it becomes possible to transfer picture data corresponding to the selected size of a screen of the designated information processing apparatus to which the picture data is to be transferred. Thus, the operating efficiency is also improved.

The seventh feature of the present invention resides in the fact that, in the above information processing apparatus, the means for selecting the size of a picture is effected by switching the size in sizes prepared in advance.

In accordance with the sixth feature, because the size of a picture displayed on a screen of the designated one of the other information processing apparatuses connected via the transmission unit is switched, it becomes possible to transfer the picture data according to a size desired by the user, which also improves the operating efficiency.

The eighth feature of the present invention resides in the fact that the above information processing apparatus, further includes means for automatically creating a data area having a memo note function if a data area having a memo note function does not exist in the designated one of the other information processing apparatuses connected via the transmission unit.

In accordance with the eighth feature, because a data area having a memo note function is automatically created if a data area having a memo note function does not exist in the designated one of the other information processing apparatuses connected via the transmission unit, it is possible in the designated one of the other information processing apparatuses connected via the transmission unit to refer to the picture data to be displayed by using a file listing-up function of the memo note function without searching in a file transfer area to which the file of the picture data was transferred, which further improves the operating efficiency.

The ninth feature of the present invention resides in the fact that the above information processing apparatus further includes means for adding a character string to date information in a file name setting process of the transferred file, the character string indicating that a file is to be transferred from the present information processing apparatus to the designated one of the other information processing apparatuses connected via the transmission unit.

In accordance with the ninth feature, because a character string, to indicate that a file is to be transferred from the present information processing apparatus to the designated one of the other information processing apparatuses connected via the transmission unit, is added to date information in a file name setting process of the transferred file, by referring to a file list displayed by the file listing-up function of the memo note function, it becomes possible to easily discriminate the file of the transferred picture data. Thus, the operating efficiency is further improved.

The tenth feature of the present invention to attain the above object resides in the provision of an information processing apparatus including a display unit for displaying characters and figures, an auxiliary memory for storing picture data and the like, a transmission unit for transmitting data between information processing apparatuses, and a control unit for controlling data transmission between the information processing apparatuses; wherein designated picture data is automatically clipped, and the information processing apparatus further includes means for automatically obtaining information on the presence of a memo note holder in a designated one of the other information apparatuses connected via the transmission unit, for setting the obtained information in a memo note holder presence information storing area, for creating a holder to which a file is transferred, teased on determination of the presence of a memory holder executed by checking the memo note holder presence information storing area, and for transferring the file including the clipped picture data to the designated one of the other information processing apparatuses connected to the information processing apparatus via the transmission unit.

In accordance with the teeth feature, because the information processing apparatus automatically clips designated picture data and includes means for automatically obtaining information on the presence of a memo note holder in the designated one of the other information apparatuses, for setting the obtained information in a memo note holder presence information storing area, for creating a holder to which the file is transferred, based on determination of the presence of a memory holder executed by checking the memo note holder presence information storing area, and for transferring a file including the clipped picture date to the designated one of the other information processing apparatuses connected via the transmission unit, it becomes possible to automatically transfer the clipped data to another information processing apparatus connected to the information processing apparatus, which also improves the operating efficiency.

BRIEF DESCRIPTION OF THE DRAWINGS

FIG. 10 is a flow diagram of the processing transferred file name setting in accordance with the present invention.

DETAILED DESCRIPTION OF THE EMBODIMENTS

Hereinafter, various embodiments according to the present invention will be explained with reference to the drawings.

Although the present invention provides an information processing which is capable of transferring clipped picture data via a transmission device, the following embodiments are explained by referring to an information processing apparatus which transfers the clipped picture data as an information terminal apparatus and by referring to an information processing apparatus which receives the transferred picture data as a portable information terminal apparatus.

Figure 1:
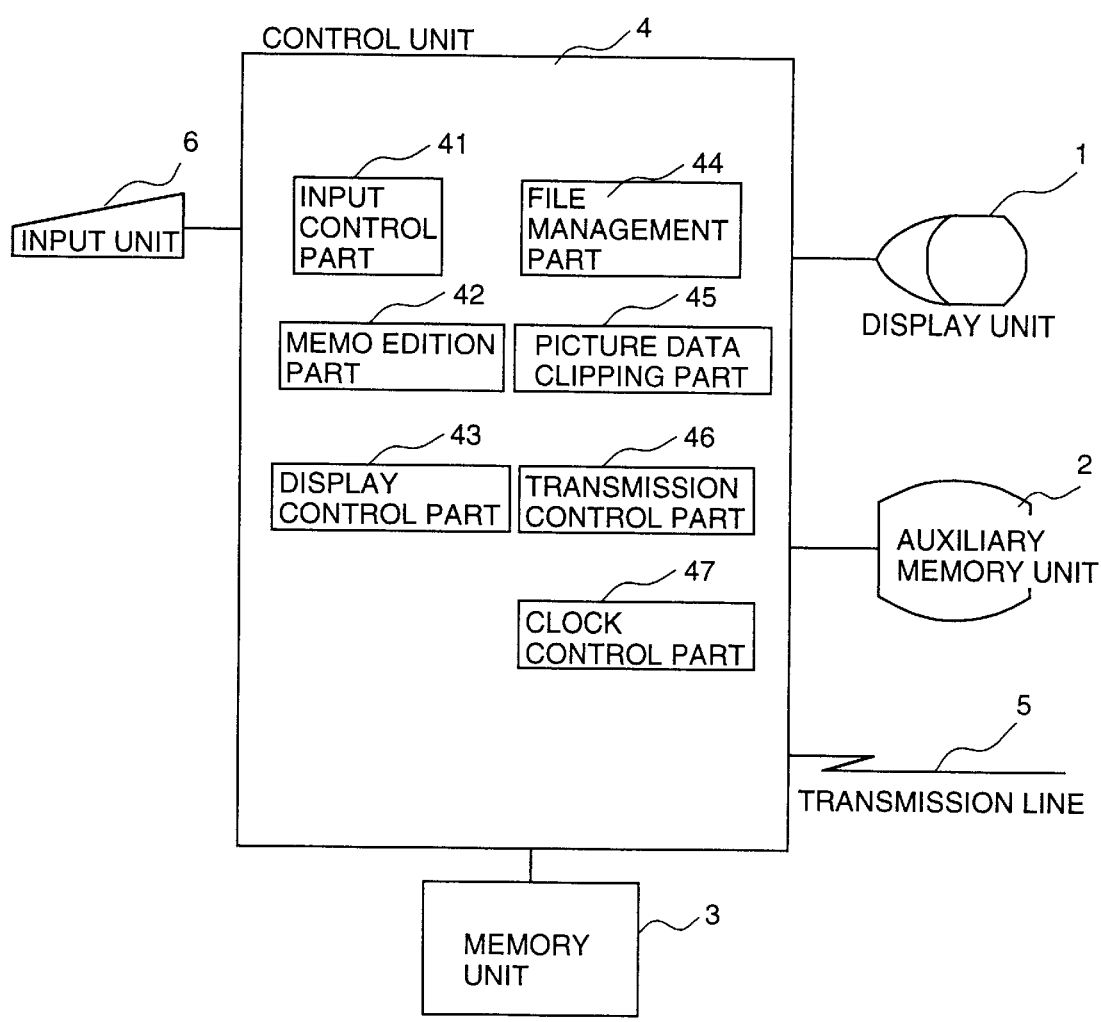
FIG. 1 is a schematic block diagram of an information terminal apparatus (information processing apparatus) representing an embodiment according to the present invention.

The information terminal apparatus shown in FIG. 1 includes a display unit 1 for displaying characters and figures, an auxiliary memory unit 2 which is nonvolatile and is capable of writing-in or reading-out data, a memory unit 3 such as a semiconductor memory device, a control unit 4, a transmission line 5, and an input unit 6 using a key board, a mouse, a pen, and so forth.

Moreover, the control unit 4 includes a microprocessor, a memory and programs, and comprises an input control part 41, a memo editing part 42, a display control part 43, a file management part 44, a picture data clipping part 45, a transmission control part 46, and a clock control part 47.

The input control part 41 sends data representing characters, figures, or information indicating a display position on a screen, which data is input via the input unit 6, to the memo editing part 42 or the picture data clipping part 45. The information indicating display positions of input areas or buttons of a work menu on the screen, which are input by clicking on the work menu or on the buttons with a mouse, are processed as selection inputs of the work menu or operation inputs of the buttons.

The memo editing part 42 executes editing processing of new memo data and renewal processing of the contents in a memo note stored in the auxiliary memory unit 2.

The display control part 43 controls the display of characters or figures on the display unit 1 in response to a display command received from the memo editing part 42 or the picture data clipping part 45.

The file management part 44 effects a reading-out of date from a file stored in the auxiliary memory unit 2 and a writing-in of data into a file in the auxiliary memory unit 2.

The picture data clipping part 45 clips picture data designated in the information terminal apparatus in response to one input operation for designation of clipped picture data, and transfers the clipped picture data to the portable information terminal apparatus connected thereto via the transmission line 5 under control of the transmission control part 46.

The transmission control part 46 executes transmission of file data by accessing a memory in the external portable information terminal apparatus via the transmission line 5.

The clock control part 47 manages the present date and time (year, month, day, hour, minute, second), and can change the present date and time. Thus, the present date and time are obtained from this part.

Figure 3:
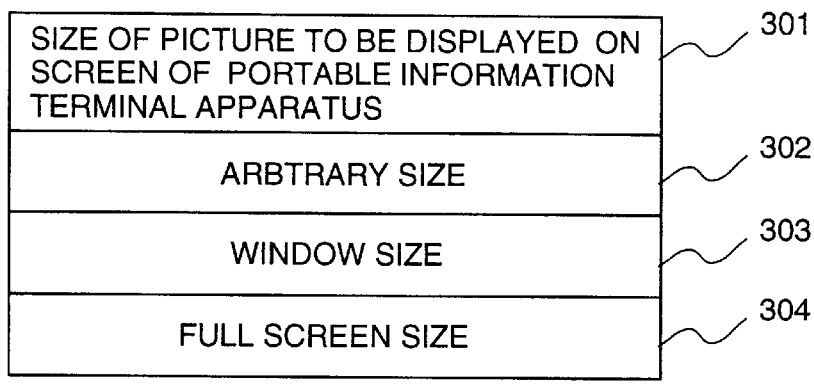
FIG. 3 is a diagram of a menu for selecting a mode of clipping picture data according to the present invention.

The contents of the memory unit 3 are shown in FIG. 3 and will be explained later.

Figure 2:
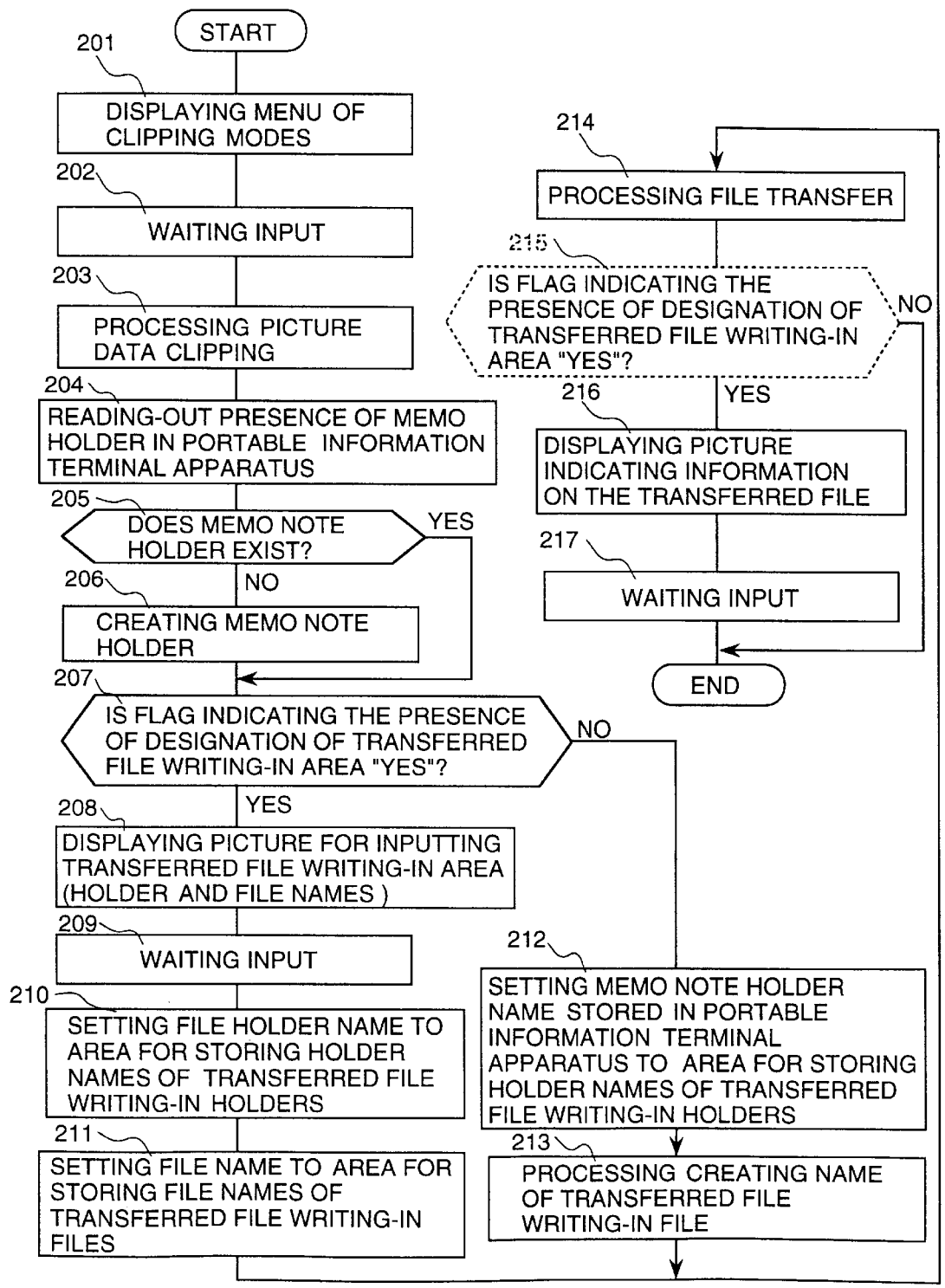
FIG. 2 is a flow diagram of the processing for clipping picture data according to the present invention.

The control unit 4 executes a processing for clipping picture data, as shown by the flow diagram in FIG. 2.

In this processing, at first, if clipping of picture data is designated in the work menu, the menu of clipping modes shown in FIG. 3 is displayed (in step 201). In this menu of clipping modes, the following picture sizes for displaying clipped picture data are available: that is, the size 301 of a screen in the portable information terminal apparatus, by which clipped picture data is displayed; an arbitrary size 302 by which clipped picture date of an arbitrary size is displayed on a screen in the portable information terminal apparatus; a window size 303 by which picture date displayed in an active application window of the information terminal apparatus is clipped; and a full screen size 304 by which all picture data displayed on the screen in the information terminal apparatus is clipped. It is possible to process the clipped picture data according to a picture size selected in the menu of clipping modes.

In step 202, the displaying of the menu in step 201 is continued, and an input for selecting a picture size is waited for until one of the clipping modes is selected.

In step 203, when one of the clipping modes is selected, the selected clipping mode is stored in a clipping mode storing area 801 in the memory unit 3, and the picture data is clipped according to the clipping mode stored in the clipping mode storing area 801. Moreover, the clipped picture data is stored in a picture data storing area 810 in the memory unit 3.

Figure 8:
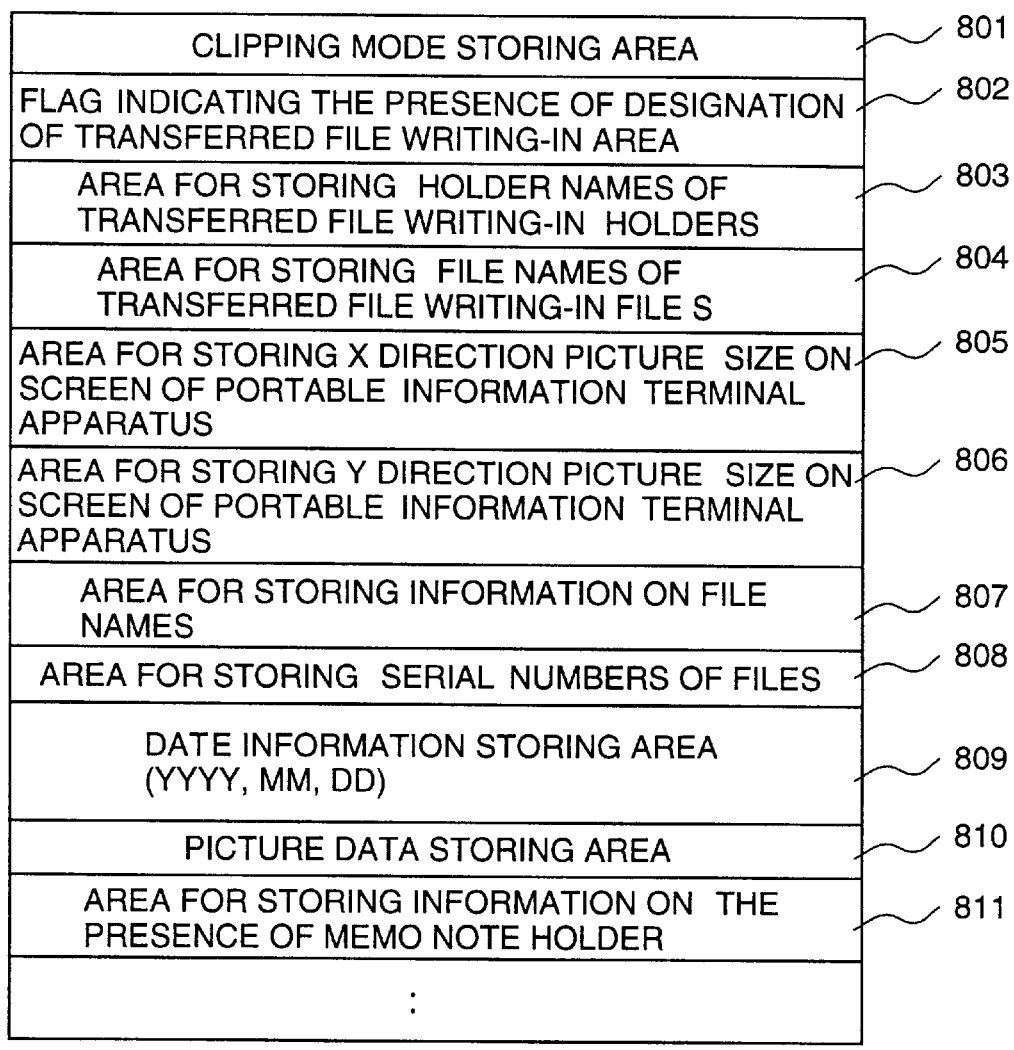
FIG. 8 is a diagram showing the contents in a memory unit in accordance with the present invention.

As shown in FIG. 8, the memory unit 3 includes the clipping mode storing area 801 for storing the modes for setting a clipped region of picture data, a flag 802 indicating the presence of a designation of a transferred file writing-in area in the portable information terminal apparatus, an area 803 for storing holder (user) names of transferred file writing-in holders, an area 804 for storing file names of transferred file writing-in files, an area 805 for storing the X direction picture size of the portable information terminal apparatus, an area 806 for storing the Y direction picture size of the portable information terminal apparatus, an area 807 for storing information on names of transferred files (referred to as transferred file names) in a memo note holder of the portable information terminal apparatus, an area 808 for storing the serial number added to each transferred file in naming the file, a date information (YYYY: year, MM: month, DD: day) storing area 809, which is obtained from the clock control part 47, the picture data storing area 810 in which the clipped picture data is stored, and an area 811 for storing information concerning the presence of a memo note holder in the portable information terminal apparatus.

Figure 9:
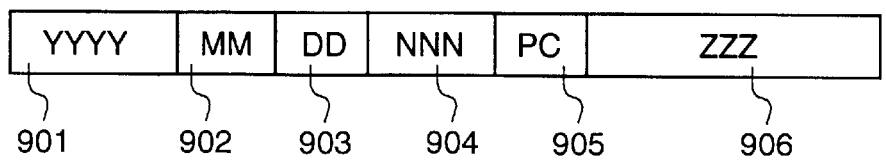
FIG. 9 is a diagram of a file name of a transferred file in accordance with the present invention.

As shown in FIG. 9, the transferred file name is composed of a string of four year designating characters (YYYY) 901, a string of two month designating characters (MM) 902, and a string of two day designating characters (DD) 903, indicating the year, the month, and the day, respectively, when the picture data is clipped, a serial number (NNN) 904, a string of two characters (PC) 905 indicating a file transferred from the terminal information apparatus, and an extension symbol (ZZZ) 906. The serial number (NNN) 905 is the ordering number assigned to each of the memo files managed on the same day, which is a number between "001" and "999".

After the clipped picture data is stored in the picture data storing area 810 in the memory unit 3 in step 203, in step 204, information as to the presence of a memo note holder in the portable information terminal apparatus connected vie the transmission line 5 is obtained via the transmission control part 46, and the obtained information is set to the area 811 for storing information on the presence of a memo note holder.

In step 205, by checking the contents of the area 811 for storing information on the presence of a memo note holder, it is determined whether a memo holder exists or not. If the result of the checking indicates that a memo note holder does not exist, a memo note holder is created in the portable information terminal apparatus by the transmission control part 46 in step 206, and the processing then goes to step 207. Conversely, if the result of the checking indicates that a memo note holder exists, processing directly goes to step 207.

Figure 4:
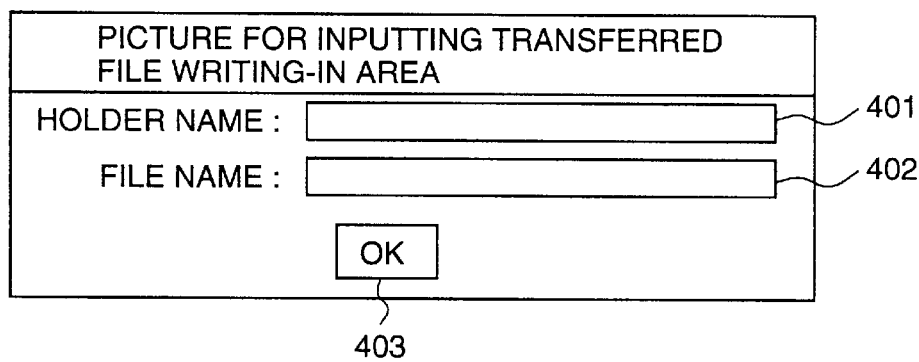
FIG. 4 is a diagram of a dialog box for inputting a transferred file writing-in area in the present invention.

In step 207, it is checked to see whether a flag 802 indicating the presence of a designation of a transferred file writing-in area indicates "Yes" or "No". If the result of the checking indicates "Yes", a dialog box for inputting a transferred file writing area is displayed as shown in FIG. 4 in step 208. The dialog box for inputting a transferred file writing-in area is composed of an area 401 for designating a holder name, and an area 402 for designating a file name in the portable information terminal apparatus to which a file of the clipped data is to be transferred, and an OK button 403 for inputting the designated holder name and the file name.

In step 209, display of the dialog box of FIG. 4 is continued until inputting of the holder name 401 and the file name 402 is completed and the OK button 403 has been clicked. When the holder name 401 and the file name 402 have been designated and the OK button 403 has been clicked, in step 210, the holder name 401 designated in the dialog box of FIG. 4 is set to the area 803 for storing holder names of transferred file writing-in holders in the memory unit 3. Furthermore, in step 211, the file name 401 designated in the dialog box of FIG. 4 is set to the area 804 for storing file names of transferred file writing-in files in the memory unit 3, and then processing goes to the next step 214.

If the result of the checking in step 207 indicates "No", in step 212, a holder name of a memo note in the portable information terminal apparatus connected via the transmission line 5 is set to the area 803 for storing holder names of transferred file writing-in holders. Furthermore, processing for creating a file name of a transferred file writing-in file, which is shown in FIG. 10, is executed in step 203, and then processing goes to step 214.

The processing for creating a file name of a transferred file writing-in file in step 213 is shown by the flow chart in FIG. 10. When this processing is invoked, in step 1001, the date information (YYYY, MM, DD) is read out from the clock control part 47 and is set to the area 804 for storing file names of transferred file writing-in files in the memory unit 3. Moreover, in step 1002, a file name "YYYYMMDD*.*" is set to the area 804 for storing file names of transferred file writing-in files in the memory unit 3. The symbol * means that any character string described here can be matched.

Furthermore, in step 1003, all files in the memo note in the portable information terminal apparatus, whose names match file names set to the area 804 for storing file names of transferred file writing-in files, are stored in the area 807 for storing information on file names in the memory 3.

In step 1004, the maximum one of the serial numbers of all files whose names are stored in the area 807 for storing information on file names in the memory unit 3 is read out, and the number (NNN) which is increased by one from the read-out maximum number is set to the area 808 for storing a file serial number in the memory unit 3.

In step 1005, the file name, "YYYYMMDDNNNPC.ZZZ" is set to the area 804 for storing file names of transferred file writing-in files in the portable information terminal apparatus connected via the transmission line 5 by using the transmission control part 46.

Figure 5:
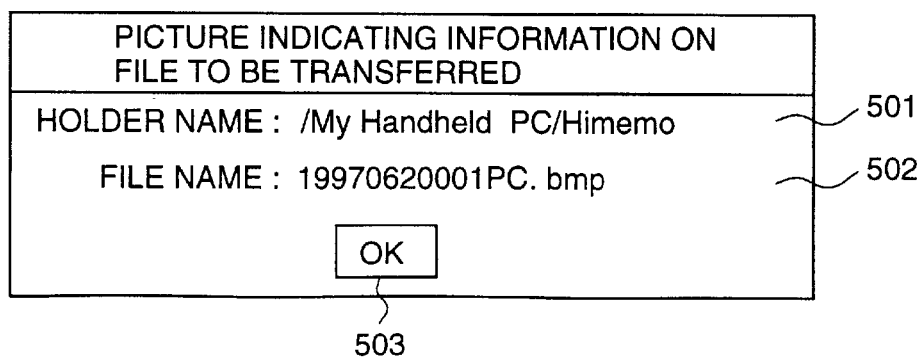
FIG. 5 is a diagram of a dialog box indicating information on a file to be transferred in accordance with the present invention.

After the process of step 214 is finished, it is checked to see whether the flag 802 indicating the presence of a designation of a transferred file writing-in area in the memory unit 3 indicates "Yes". If the result of checking for the flag 802 indicates "Yes", in step 216, the dialog box which is shown in FIG. 5, for indicating information on the file which was transferred, is displayed. This dialog box for indicating information concerning the file which was transferred is displayed when the transferring of the clipped picture data to the portable information terminal apparatus is completed, and it is composed of an holder name 501 and a file name 502 in the portable information apparatus, and an OK button for inputting a confirmation of the holder name and the file name.

In step 217, the display of the dialog box indicating information on a file to be transferred in step 206 is continued until the OK button 503 is clicked, and when the OK button 503 is clicked, processing for clipping the picture data is finished. On the other hand, if the result of checking for the flag 802 in step 215 indicates "No", processing for clipping the picture data is ended (it is also possible to remove the above-mentioned step 215 of checking the content of the flag).

Figure 6:
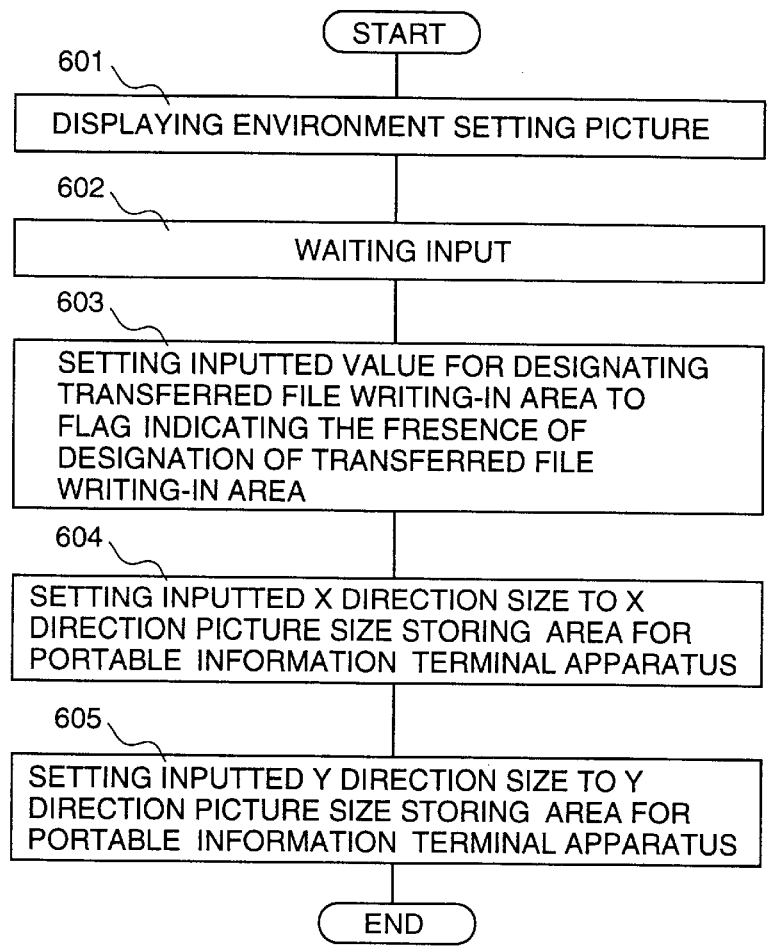
FIG. 6 is a flow diagram of the processing for setting a picture data clipping environment in accordance with the present invention.
Figure 7:
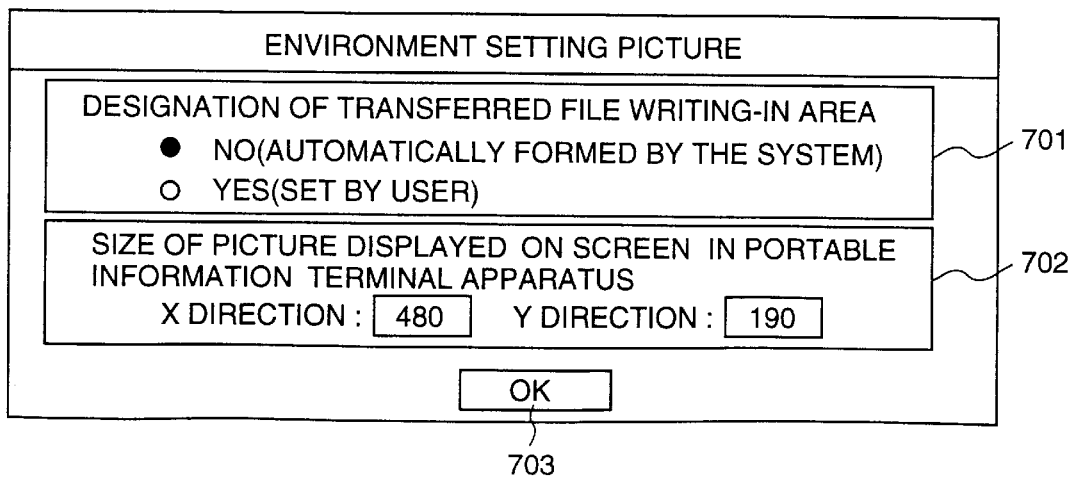
FIG. 7 is a diagram of a dialog box for an environment setting picture in accordance with the present invention.

In the following, the setting of the environment conditions for clipping picture data will be explained in detail with reference to FIG. 6. If a menu for setting of the environment conditions for clipping picture data is demanded, in step 601, the environment setting dialog box shown in FIG. 7 is displayed.

The environment setting dialog box is composed of an area 701 for indicating whether to designate a transferred file writing-in area in the portable information terminal apparatus connected via the transmission line 5, an area 702 for designating the size of a picture displayed on a screen of the portable information terminal apparatus when the selected clipping mode designates the size of the screen of the portable information terminal apparatus, and an OK button 703 for inputting the completion of designation of the contents of the areas 701 and 702. The contents of the areas 701 and 702 displayed in the environment setting dialog box are the last set contents.

In invoking processing for clipping picture data, default contents are set to the area 701 for designating a transferred file writing-in area and the area 702 for designating the size of a picture displayed on the screen of the portable information terminal apparatus: that is, "NO" has been set to the area 701, and the standard size (for example, the X direction size: 480, and the Y direction size: 190) has been set to the area 702. By using this environment setting dialog box, in step 602, a transferred file writing-in area is set, and the size of a picture displayed on the screen of the portable information terminal apparatus is input, and the display of this dialog box is continued until the OK button 703 for inputting the completion of designation of the contents of the areas 701 and 702 is clicked in step 602.

If the OK button 703 is clicked, the input information concerning the designation of a transferred file writing-in area is set to the flag 802 indicating the presence of a designation of a transferred file writing-in area in the memory unit 3 in step 603, and further, in steps 604 and 605, the input X direction size and Y direction size of a picture displayed on a screen of the portable information terminal apparatus are set to the area 805 for storing the X direction picture size and the area 806 for storing the Y direction picture size of the portable information terminal apparatus, respectively. Thus, the setting of the environment conditions for clipping picture data is finished.

What is claimed is:

1. An information processing apparatus including a display unit for displaying characters and figures, an auxiliary memory unit for storing picture data, a transmission medium for transmitting data to other information processing apparatuses, and a transmission control unit for controlling data transmission with said other information processing apparatuses, wherein designated picture data is automatically clipped; said information processing apparatus further including means for automatically controlling transfer of a file including said clipped picture data to a designated one of said other information processing apparatuses connected to said information processing apparatus via said transmission medium.

2. An information processing apparatus according to claim 1, wherein an area to which said file is transferred in said one of said other information processing apparatuses is a data area of a memo note having a function of managing files of memo data with date information, and listing-up said files in the order of date, and wherein date information indicating the time when said file is transferred is added to a name of said file to be transferred.

3. An information processing apparatus according to claim 2, further including means for setting whether to designate an area and a name of a file in said area in said designated one of said other information processing apparatuses connected via said transmission medium, to which a file is to be transferred, by using an environment setting dialog box.

4. An information processing apparatus according to claim 3, further including means for designating a name of a file and a transferred file writing-in area to which said picture data is transferred, when said picture data is clipped, if it is designated in said environment setting dialog box in advance to input a file name and a transferred file writing-in area to which said picture data is to be transferred.

5. An information processing apparatus according to claim 2, further including means for displaying a name of a file and a designation of a transferred file writing-in area to which said picture data was transferred.

6. An information processing apparatus according to claim 1, further including means for selecting the size of a picture to be displayed on a screen of said designated one of said other information processing apparatuses connected via said transmission medium when said picture data is clipped and said file including said clipped picture data is transferred.

7. An information processing apparatus according to claim 6, wherein said means for selecting the size of a picture provides for switching the size in sizes prepared in advance.

8. An information processing apparatus according to claim 2, further including means for automatically creating a data area having a memo note function if a data area having a memo note function does not exist in said designated one of said other information processing apparatuses connected via said transmission medium.

9. An information processing apparatus according to claim 2, further including means for adding a character string to said date information, said character string indicating that said file is to be transferred from said information processing apparatus to said designated one of said other information processing apparatuses connected via said transmission medium.

10. An information processing apparatus including a display unit for displaying characters and figures, an auxiliary memory for storing picture data, a transmission medium for transmitting data to other information processing apparatuses, and a transmission control unit for controlling data transmission with said other information processing apparatuses, wherein picture data which are designated are automatically clipped; said information processing apparatus further including means for automatically obtaining information on the presence of a memo note holder in a designated one of said other information apparatuses connected via said transmission medium, setting the obtained information in a memo note holder presence information storing area, creating a holder to which a file including said clipped picture data is transferred, based on determination of the presence of a memory holder executed by checking said memo note holder presence information storing area, and transferring said file to a designated one of said other information processing apparatuses connected via said transmission medium.

* * * * *